(12) United States Patent
Chi et al.

(10) Patent No.: US 6,479,188 B1
(45) Date of Patent: *Nov. 12, 2002

(54) CATHODE TUBE AND METHOD OF MAKING THE SAME

(75) Inventors: Ignacio Chi, Dracut, MA (US); George Cintra, Holliston, MA (US); Gary Searle, Norfolk, MA (US)

(73) Assignee: The Gillette Company, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,799

(22) Filed: Oct. 13, 1999

(51) Int. Cl.⁷ .................................................. H01M 8/04
(52) U.S. Cl. .................. 429/217; 429/229; 429/232; 429/233; 429/236
(58) Field of Search ................................ 429/217, 229, 429/232, 233, 236

(56) References Cited

U.S. PATENT DOCUMENTS

| | | | |
|---|---|---|---|
| 3,391,563 A | 7/1968 | Donegan | 72/258 |
| 3,608,345 A | 9/1971 | Bouchereau | 72/47 |
| 3,648,351 A | 3/1972 | Kibler | 29/420 |
| 3,694,268 A | 9/1972 | Bergum | 136/175 |
| 3,697,328 A | 10/1972 | Bilhorn | 136/175 |
| 3,708,349 A | 1/1973 | Macauley et al. | 136/175 |
| 3,740,270 A | 6/1973 | Bilhorn | 136/111 |
| 3,775,190 A | 11/1973 | Oakley | 136/175 |
| 3,963,519 A | 6/1976 | Louie | 136/86 A |
| 4,121,020 A | 10/1978 | Epstein et al. | 429/162 |
| 4,294,899 A | 10/1981 | Witherspoon | 429/206 |
| 4,354,958 A | 10/1982 | Solomon | 252/425.3 |
| 4,556,618 A * | 12/1985 | Shia | 264/127 |
| 4,666,799 A | 5/1987 | Runquist et al. | 429/101 |
| 4,693,946 A | 9/1987 | Niksa et al. | 429/27 |
| 4,816,355 A | 3/1989 | Kulibert et al. | 429/174 |
| 4,826,744 A | 5/1989 | Itou et al. | 429/206 |
| 4,853,305 A | 8/1989 | Anderman et al. | 429/212 |
| 4,971,867 A | 11/1990 | Watanabe et al. | 429/61 |
| 5,008,161 A | 4/1991 | Johnston | 429/7 |
| 5,316,556 A | 5/1994 | Morris | 29/623.3 |
| 5,393,617 A | 2/1995 | Klein | 429/59 |
| 5,456,000 A | 10/1995 | Gozdz et al. | 29/623.2 |
| 5,518,834 A | 5/1996 | Yoshizawa et al. | 429/59 |
| 5,637,416 A | 6/1997 | Yoshii et al. | 429/94 |
| 5,707,763 A * | 1/1998 | Shimizu et al. | 429/217 |
| 6,232,007 B1 * | 5/2001 | Payne et al. | 429/27 |

FOREIGN PATENT DOCUMENTS

| | | |
|---|---|---|
| EP | 0 791 974 A1 | 8/1997 |
| EP | 0 875 524 A2 | 11/1998 |
| EP | 0 940 873 A2 | 9/1999 |
| GB | 407994 | 3/1934 |
| GB | 2 109 622 | 6/1983 |
| JP | 58-75773 | 5/1983 |
| JP | 58121561 | 7/1983 |
| JP | 58-198862 | 11/1983 |
| JP | 59098479 | 6/1984 |
| JP | 5-47388 | 2/1993 |
| JP | 05047422 | 2/1993 |
| JP | 5-1444482 | 6/1993 |
| JP | 7-201335 | 8/1995 |
| JP | 8-162173 | 6/1996 |
| JP | 8-287920 | 11/1996 |

OTHER PUBLICATIONS

James S. Reed, "Introduction to the Principles of Ceramic Processing," John Wiley & Sons, 1988, pp. 355–377.*

* cited by examiner

Primary Examiner—Carol Chaney
Assistant Examiner—Dah-Wei D. Yuan
(74) Attorney, Agent, or Firm—Fish & Richardson P.C.

(57) ABSTRACT

A seamless cathode tube is made by applying a cathode coating mixture to a current collector tube. After application, the cathode coating mixture stiffens to form a seamless cathode tube.

19 Claims, 5 Drawing Sheets

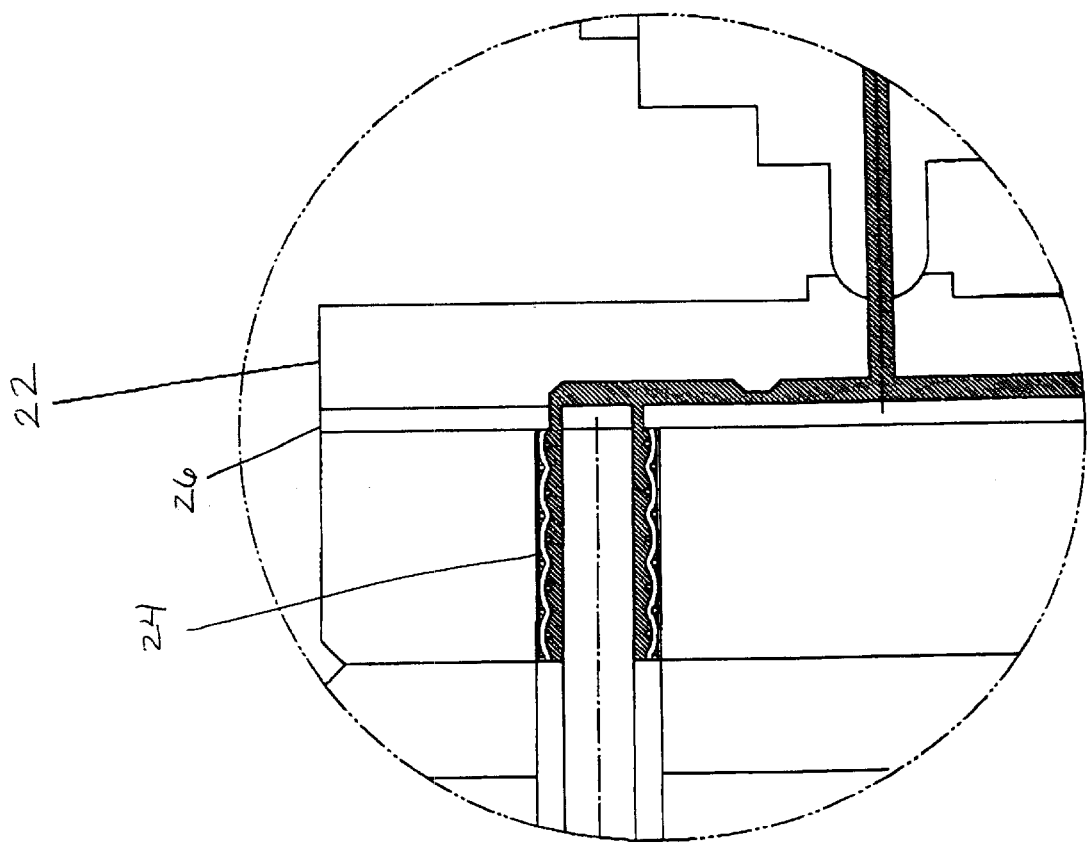

CATHODE TUBE AND METHOD OF MAKING THE SAME

BACKGROUND OF THE INVENTION

The invention generally relates to electrochemical cells.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a sheet-like layer, typically called the separator.

When a battery is used as an electrical energy source in a device, such as a hearing aid or a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal air electrochemical cell, the cathode structure contains a material that can catalyze the reduction of oxygen which enters the cell as a component of atmospheric air passing through access ports in the container. Zinc oxide, or zincate, is formed in the anode. Thus, the overall electrochemical reaction within the cell results in zinc metal being oxidized to zinc ions and oxygen from the air being reduced to hydroxyl ions. While these chemical reactions are taking place, electrons are transferred from the anode to the cathode, providing power to the device.

Zinc cathode materials have traditionally been manufactured using flat processes such as dry coating and paste coating. For use in cylindrical zinc air batteries, the flat cathode sheets are welded together to create a cathode tube. Cathode tubes made by such processes typically have a seam were the edges of the sheet are welded together to form the cylindrical structure.

SUMMARY OF THE INVENTION

In general, the invention relates to cathode tubes for metal air electrochemical cells and methods for making the cathode tubes. The cathode tubes are seamless. Unlike cathode tubes made by flat processed materials which have reduced ionic conversion at the seam, the seamless cathode tubes allow for the total surface of the tube to be utilized for conversion of hydroxyl ions. In addition, production of a seamless cathode tube eliminates the potential for leakage at the seam of the tube. As a result, electrochemical cells including these seamless cathode tubes can therefore be used to produce seamless cathode tubes for use in electrochemical cells which have good discharge characteristics and leakage resistance.

In one aspect, the invention features a method of making a seamless cathode tube. The method includes applying a cathode coating mix to a current collector tube, the cathode coating mix stiffening to form a seamless cathode tube.

Preferably, the cathode tube is made by applying a coating mix which includes a binder, e.g., a polymer, which is hydrophobic and/or has a fibrous final state. Examples of such binders include polytetrafluoroethylene (PTFE), PTFE copolymers, polyvinylidenefluoride (PVDF), hexofluoropyopalene (HFP)/ polyvinylidenefluoride (PVDF) copolymers, HFP/PVDF/PTFE tetrapolymers, polyethylene (PE) and ultrahydrated PE. The coating mix can be applied onto the current collector tube, e.g., a screen tube, such that a binder such as PTFE fibrillates and the cathode coating mix stiffens to form a seamless cathode tube. Methods of applying the coating mix such that the binder fibrillates include continuous extrusion, impact extrusion, compression molding, transfer molding and injection molding. These methods push binder particles past each other resulting in stretching and fiber formation, i.e., fibrillation. In addition, these methods induce fibrillation later in the processing stage, e.g., as the coating mix is being applied to the current collector, thereby avoiding overstretching of the binder fibers which can occur if fibrillation happens too early in the process.

There are several advantages to using a binder such as PTFE. PTFE is hydrophobic and resists wetting, thereby creating pathways for oxygen to enter the cathode structure. In addition, due to its very high molecular weight, PTFE has inherent fibrillation properties. The particle to particle contact of fibrillation results in voids. Thus, a binder such as PTFE provides porosity to the finished cathode tube. PTFE also provides structural integrity and flexibility to the finished cathode tube.

The cathode coating mix can also include a solvent. The addition of a solvent to the coating mix has several advantages. For example, the addition of a solvent to the coating mix forms a flowable mixture that can be applied to the current collector tube using extrusion, e.g., continuous or impact extrusion, or molding, e.g., compression, transfer, or injection molding. In addition, the solvent can serve as a lubricant to control fibrillation of the binder, thereby decreasing the amount of fibrillation that occurs prior to application of the mix to the current collector tube. The solvent can later be removed from the cathode tube during a lubricant/solvent removal step.

In another aspect, the invention features a method of making a seamless cathode tube by injection molding. The method can include placing a current collector tube into a molding cavity, and injecting a cathode coating mix. The cathode coating mix stiffens to form a seamless cathode tube. The method can also include injection molding the cathode mix into a tube.

The production of seamless cathode tubes by injection molding results in a more efficient assembly process which can be used to produce discrete finished parts. The injection molding process, as compared to converting flat sheet material, results in fewer process steps and components to complete the cathode sub assembly and subassembly of the electrochemical cell itself. The production of seamless cathode tubes by injection molding provides a more homogenous structure that flat sheets that are converted into tubes. The methods of making seamless cathode tubes using injection molding can therefore be used to make seamless cathode tubes having good performance characteristics made in a high rate assembly process.

Other features and advantages of the invention will be apparent from the description of the preferred embodiment thereof and from the claims.

BRIEF DESCRIPTION OF THE DRAWING

FIGS. 4A and 4B show an injection molding system.

DESCRIPTION OF THE PREFERRED EMBODIMENTS

Figure 1:
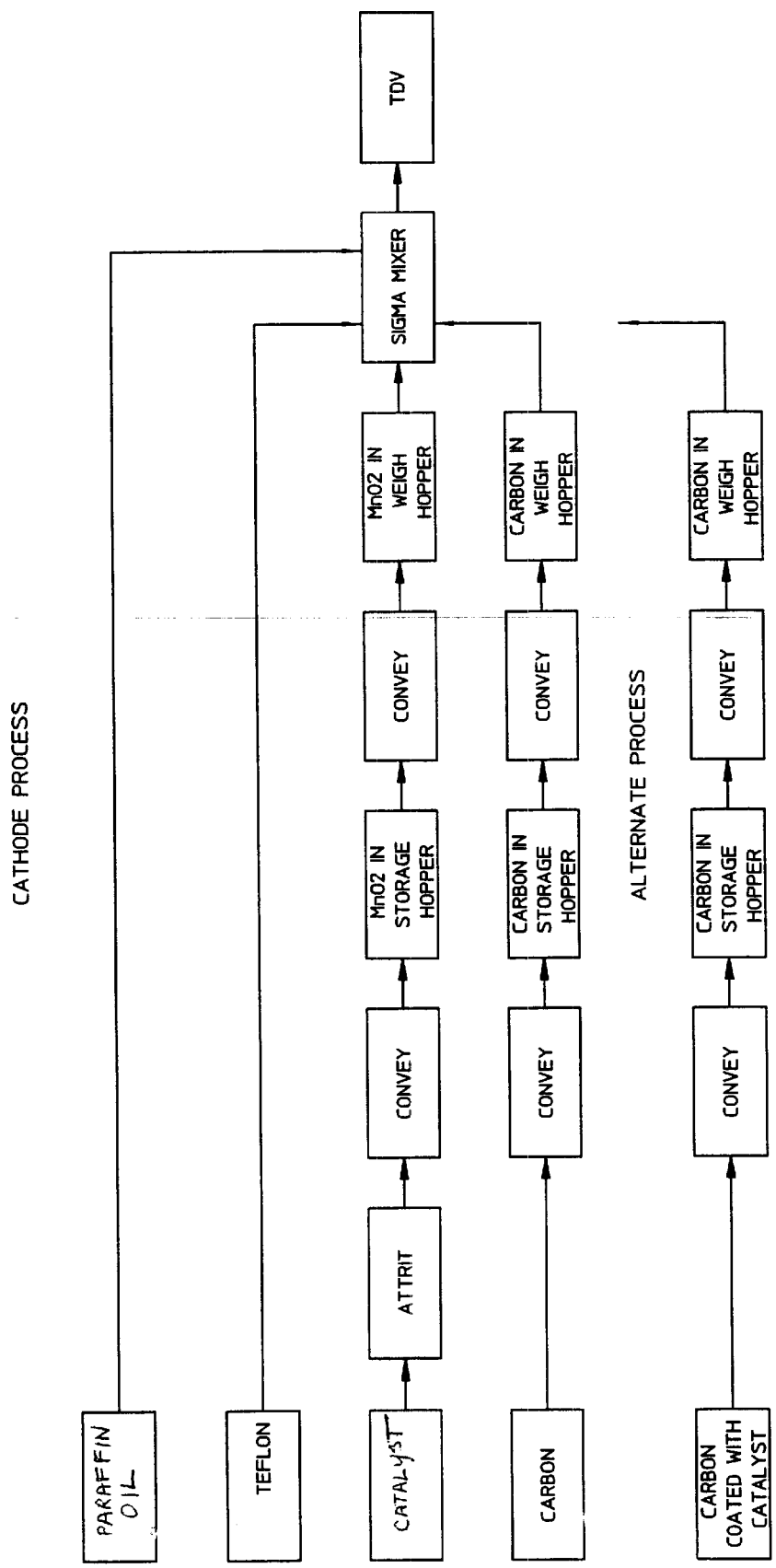
FIG. 1 shows a process for cathode tube production.

The methods can be used to make seamless cathode tubes for use in electrochemical cells such as zinc air cells.

The cathode structure includes a current collector, such as a wire screen, upon which is deposited a cathode mixture. The current collector tube as used herein refers to a tube which ultimately will function as a current collector. The wire mesh makes electrical contact with the cathode can.

A cathode screen tube is formed, for example, by folding the edges of the mesh over each other, cold rolling, or fastening the edges together by stapling, welding or use of an adhesive. Methods of welding include ultrasonic welding, laser welding, resistance welding, pressure bonding and plasma welding. Alternatively, a seamless screen tube can be formed. Methods for forming a seamless screen tube include helical strip winding, wire braiding and the use of helical woven mesh. The outside of this tube faces the air access ports and can be covered by a microporous membrane, e.g., a polytetrafluoroethylene (PTFE) membrane, that can help prevent drying of the anode gel and leakage of electrolyte from the cell. optionally, the PTFE can in turn be covered by an air disperser, or blotter material. The air disperser is an porous or fibrous material that helps maintain an air diffusion space between the PTFE membrane and the cathode can.

For injection molding, the cathode screen tube is then placed in an injection molding cavity. A microporous membrane, e.g., a PTFE membrane, may be wrapped or heat-shrinked around the screen prior to being placed in the cavity.

The active cathode coating mix is then injected into the injection cavity. The catalyst mixture is composed of a mixture of a binder, carbon particles, a solvent and a catalyst for reducing oxygen, such as a manganese compound. The binder is a polymer that has one or more of the following characteristics: 1) it is hydrophobic; and 2) it has a fibrous final state. A "fibrous final state" refers both to polymers which are fibrous prior to use in the methods of the invention and polymers which become fibrous by a processing step, e.g., extrusion or molding. Various extrusion and molding techniques are disclosed in *The Plastics Engineering Handbook*, pp. 204–240. Examples of binders include PTFE, PTFE copolymers, PVDF, HFP/PVDF copolymers, HFP/PVDF/PTFE tetrapolymers, polyethylene (PE) and ultrahydrated PE. Solvents which can be used in the coating mix include water, paraffin oils such as but not limited to isopar, e.g., isopar G or isopar M, isopropanol and diethyl glycol monobutyl ether. Preferably, the paraffin oil has a distillation range of 320 F to 592 F.

The catalyst mixture can be prepared, for example, by heating manganese nitrate or by reducing potassium permanganate to produce manganese oxides, such as $Mn_2O_3$, $Mn_3O_4$, and $MnO_2$.

The coating mixture can include between about 3 and 75 percent, about 15 and 45 percent, about 20 and 40 percent, about 30 and 35 percent PTFE by weight. If the mixture contains PTFE, when the mix is forced into the cavity the PTFE fibrillates, or stretches, which in turn strengthens the structure. This allows the mix and screen to be strong enough to stand upright without additional support.

Figure 4A:
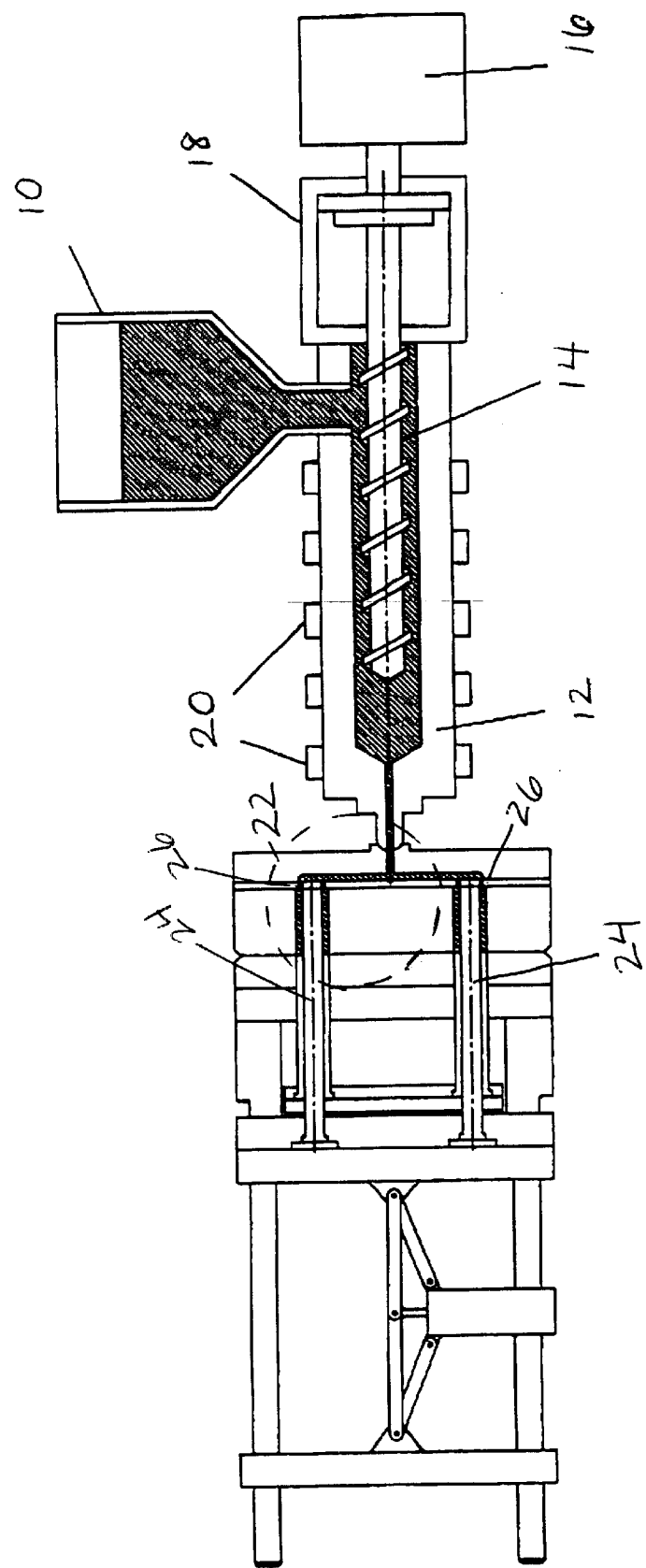

FIGS. 4A and 4B set forth the basic elements of injection molding. Referring to FIG. 4A, the coating mix can be added into a hopper (10), which drops the coating mixture onto a barrel (12) and screw (14) device. A screw driver motor (16) connected to an injection cylinder (18) turns the screw (14) and moves the screw (14) up and down through the barrel. The coating mix is moved by the screw (14) into a runner system (22). As shown in FIG. 4B, the runner system (22) injects the coating mix into the molding cavity (24) through a ring gate system (26). The ring gate (26) can be slidable, thereby providing temporary separation between the runner system (22) and the cavity (24). The runner system (22) can connect to multiple molding cavities such that several cathode tubes can be produced at once.

Various elements of the injection molding process can be modified to control the degree of binder fibrillation during the injection molding process. For example, fibrillation can be increased or retarded by adding heat or chilling, respectively, to the mix. Thus, various elements may be added or changed on the injection molding system to provide control over the degree of fibrillation at various steps of the process. Modifications to the system can include a cooling jacket on the barrel (12) to reduce fibrillation and/or a heated runner system (22) to increase fibrillation. In addition, modifications can be made to reduce the space the mix is passed through, thereby inducing fibrillation. Such modifications can be made to various elements of the injection molding process including the barrel (12), the runner system (22) and the ring gate system (26). For example, the runner system (22) can be reduced such that the area which the coating mix is passed is restricted. A restricted runner system increases the particle to particle contact which induces the binder to fibrillate prior to or at the time of passage through the ring gate (26) and into the molding cavity (24).

Once the coating mix is injected into the cavity, the coating mix stiffens. The cathode assembly is then removed from the mold, and any solvent is thereafter removed from the cathode structure. This is also referred to as the lubricant/ removal step. The solvent can be removed using, for example, volatization, evaporation (e.g., vacuum or temperature evaporation), or extraction.

The seamless cathode tube can then be inserted into an electrochemical cell such as a zinc air cell.

A pre-formed can is formed. A ring of conductive hot melt is placed at the bottom of the can. Heat is applied to the bottom of the can approximately at the same time that the cathode tube is pressed into the bottom of the can. The external louvers formed in the cathode can help to centralize the cathode tube within the can. Heat may be applied at the bottom of the can to soften the conductive hot melt as the cathode tube is pressed through the melt. Alternatively, the hot melt may not be conductive, such that the cathode tube would have to electrically contact the bottom of the can. Electrical contact may be made by pressing the cathode into direct physical contact with the bottom of the can, or by, for example, welding the cathode screen of the cathode tube to the bottom of the can.

The separator material is then inserted into the can. The separator can be a porous, electrically insulating polymer, such as polypropylene, that allows the electrolyte to contact the air cathode. A "tube and disc" separator is used in preferred embodiments. The inner cavity formed by the separator is then filled by anode gel.

The anode gel contains a mixture of zinc and electrolyte. The mixture of zinc and electrolyte can include a gelling agent that can help prevent leakage of the electrolyte from the cell and helps suspend the particles of zinc within the anode.

The zinc material can be a zinc alloy powder that includes less than 2 percent mercury, preferably no added mercury. The zinc material can be is alloyed with lead, indium, or aluminum. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth. Alternatively, the zinc can include lead without other metal additive. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety. The zinc can be a powder. The particles of the zinc can be spherical or nonspherical. For example, the zinc particles can be acicular in shape (having an aspect ratio of at least two).

The zinc material includes a majority of particles having sizes between 60 mesh and 325 mesh. For example, the zinc material can have the following particle size distribution:

0–3 wt % on 60 mesh screen;

40–60 on 100 mesh screen;

30–50 wt % on 200 mesh screen;

0–3 wt % on 325 mesh screen; and

0–0.5 wt % on pan.

Suitable zinc materials include zinc available from Union Miniere (Overpelt, Belgium), Duracell (USA), Noranda (USA), Grillo (Germany), or Toho Zinc (Japan).

A preferred gelling agent is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. Nos. 4,541,871, 4,590,227, or U.S. Pat. No. 4,507,438.

In certain embodiments, the anode gel can include a non-ionic surfactant, and an indium or lead compound, such as indium hydroxide or lead acetate. The anode gel can include between about 50 and 500 ppm, preferably between 50 and 200 ppm, of the indium or lead compound. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

Figure 2:
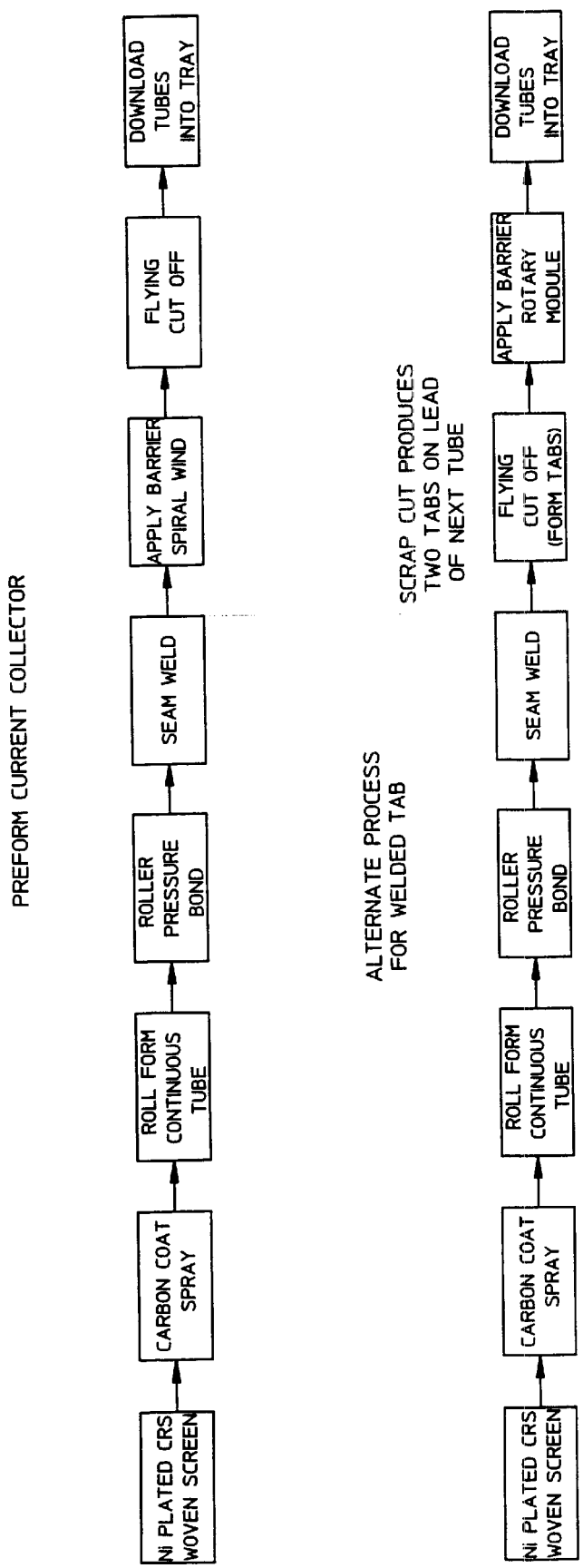
FIG. 2 shows a process for preform current collector production.
Figure 3:
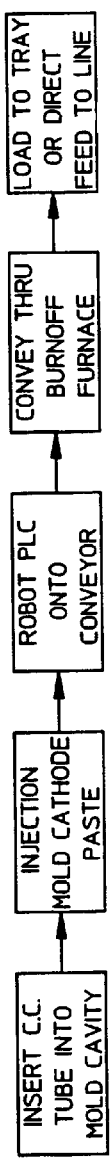
FIG. 3 shows a process for cathode injection molding.

A pre-assembled top assembly is then inserted in the tope of the cell. The upper external periphery (i.e., the lip) of the cell is then swaged down over the pre-assembled top assembly to seal the top assembly at the top of the cell. As noted in FIG. 2, a hot melt adhesive or sealant is typically used between the seal and the cathode tube.

During storage, the air access ports are typically covered by a removable sheet, commonly known as the seal tab, that is provided on the bottom of the cathode can to cover the air access ports to restrict the flow of air between the interior and exterior of the button cell. The user peels the seal tab from the cathode can prior to use to allow oxygen from air to enter the interior of the button cell from the external environment.

Other embodiments are within the claims.

What is claimed is:

1. A method of making a seamless cathode tube, comprising:

applying a cathode coating mix comprising a binder to a current collector tube such that the binder fibrillates, the cathode coating mix stiffening to form a seamless cathode tube.

2. The method of claim 1, wherein the cathode coating mix is applied by extrusion.

3. The method of claim 2, wherein the mix is applied by ram extrusion or screw extrusion.

4. The method of claim 1, wherein the cathode coating mix is applied by injection molding.

5. The method of claim 1, wherein the current collector tube is a screen tube.

6. The method of claim 5, wherein the screen tube is wrapped in a microporous membrane prior to placing the screen tube into the injection cavity.

7. The method of claim 6, wherein the microporous membrane is PTFE.

8. The method of claim 1, wherein the cathode coating mix further comprises a carbon substance and a catalyst.

9. The method of claim 1, wherein the binder is a polymer.

10. The method of claim 9, wherein the polymer is PTFE.

11. The method of claim 8, wherein the catalyst is a manganese compound.

12. The method of claim 11, wherein the manganese compound is selected from the group consisting of $Mn_2O_3$, $Mn_3O_4$, and $MnO_2$.

13. The method of claim 1, wherein the cathode coating mix comprises between about 15 and 45 percent binder by weight.

14. The method of claim 1, wherein the cathode coating mixture further comprises a solvent.

15. The method of claim 14, wherein the solvent is a paraffin oil.

16. The method of claim 15, wherein the paraffin oil is isopar.

17. The method of claim 1, further comprising inserting the cathode tube into a cylindrical battery.

18. The method of claim 17, wherein the battery is a metal air battery.

19. The method of claim 18, wherein the metal air battery is a zinc air battery.

* * * * *

UNITED STATES PATENT AND TRADEMARK OFFICE
CERTIFICATE OF CORRECTION

PATENT NO.   : 6,479,188 B1
DATED        : November 12, 2002
INVENTOR(S)  : Ignacio Chi, George Cintra and Gary M. Searle It is certified that error appears in the above-identified patent and that said Letters Patent is hereby corrected as shown below:

<u>Title page,</u>
Item [56], U.S. PATENT DOCUMENTS, delete "4,693,946 A   9/1987" and insert -- 4,693,946 A   9/1997 --.

Signed and Sealed this

Twenty-fifth Day of March, 2003

JAMES E. ROGAN
*Director of the United States Patent and Trademark Office*